UNITED STATES PATENT OFFICE.

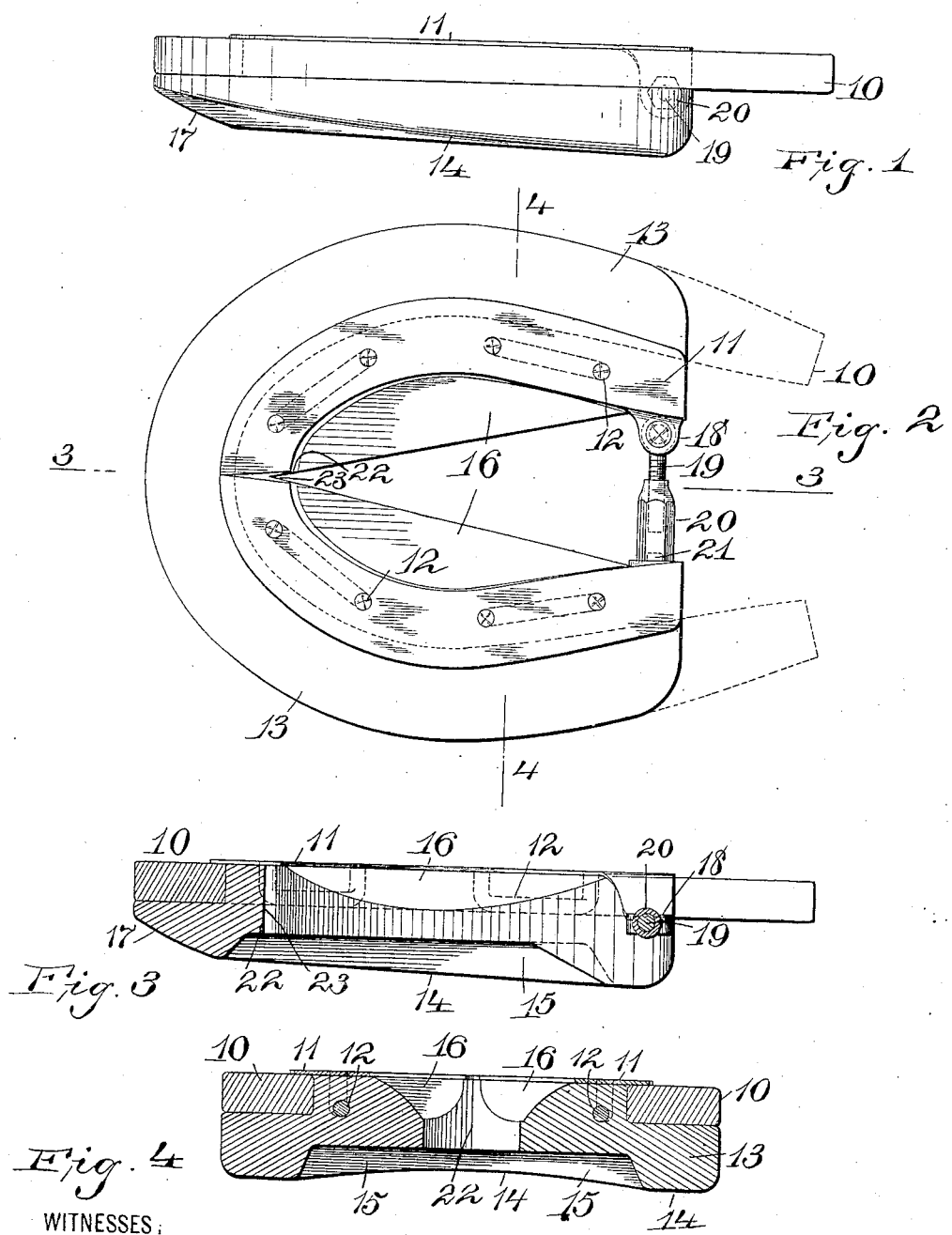

JEROME BERNARD McARDLE, OF WEST ORANGE, NEW JERSEY.

HORSESHOE-PAD.

No. 865,422.          Specification of Letters Patent.          Patented Sept. 10, 1907.

Application filed January 4, 1907. Serial No. 350,746.

*To all whom it may concern:*

Be it known that I, JEROME BERNARD MCARDLE, a citizen of the United States, residing at West Orange, in the county of Essex and State of New Jersey, have invented certain new and useful Improvements in Horseshoe-Pads; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This device is a pad, preferably made of rubber, that is adapted to be attached to and detached from a horseshoe while the shoe is on the horse's foot or removed therefrom, and is arranged to cover the shoe and the hoof, except for the space occupied by the frog of the hoof, this structure preventing ice, snow or dirt from accumulating between the hoof and the pad.

The device comprises a pad of resilient material, with a device arranged to spread the members to hold them in contact with the shoe, and the resilient pad, when swung together, can be withdrawn through the space inside the sides of the shoe.

Another object of the device is to provide pads, of this kind, that are provided with metallic plates on their top edges to engage the top side of the shoe, around its inner edge, and to provide the plates with members to project into the pad and to be molded in the pad to secure the pad to the metallic plates.

The invention is illustrated in the accompanying drawings, in which

Figure 1 is a side view of the device, and Fig. 2 is a top view of the same. Fig. 3 is a section on line 3, 3, in Fig. 2, and Fig. 4 is a cross-section on line 4, 4, in Fig. 2.

The device can be attached to any style of horseshoe 10, and the pad is composed of a resilient pad, preferably of rubber, that has, on the top, metallic plates 11, these plates fitting over, for a short distance, onto the top edge of the shoe, and secured to these plates 11, in any well known manner, but preferably riveted thereto, are the looped bars or staples 12 to project downward, and which can be inserted in a mold when the device is made, and around which are molded the pads 13. The loops and the plates can be cast in one piece, if desired. The pads, on their tread surfaces 14, can be roughened, corrugated, or indented, as is usual with pads of this kind, to give a better pur-chase. The under side of the pad is recessed, as at 15, to give a better suction and to also lighten the pad, and the pad extends across between the sides leaving a tapered opening when the members are swung apart, and is provided with a cut away portion 16, the tapered opening and the cut away portions acting to receive the frog of the hoof of the horse. The tread portion of the pads is cut away, as at 17, in the preferred style so that there will be no likelihood of the horse stumbling or tripping, and thus acting to tear the pads off. This formation at the front, however, can be dispensed with, and the configuration of this part of the pad can be changed to suit the circumstances.

The tapered portion between the side portions of the pad having the flat sides 22 and the apex 23 allows the portions to be swung together, and when the portions are allowed to spring apart, they are secured by a spreading device that is attached to a clip 18 on the end of one of the metallic plates 11, and consists of a pivoted screw 19 which has, thereon, a nut 20, and this nut 20, when it is screwed in one direction, bears against the end of the other metallic plate 11 and is prevented from being displaced by a small stud 21 which fits up in the bore of the nut. In this device the pad is well secured to the shoe by means of the plates 11, and the pad is also closely attached to the plates 11 by means of the staples or loops 12 which are embedded in the pad. The device can be attached or detached from a shoe while the shoe is on the horse, and when it is to be detached, the nut, shown more particularly in Fig. 2, is screwed up on the screw 19 until it is disengaged from the stud 21. The nut and the screw can then be swung outward, and the pad can be swung together which allows the device to be drawn out through the opening in the shoe. This also provides a pad that can be put on in a hurry, and removed when the necessity for it, sometimes of very short duration, is past. The resilient member compresses sufficiently to allow the pad to be pressed through the bottom of a shoe.

Having thus described my invention, what I claim is:—

1. A pad for horseshoes, comprising a pad portion to fit the bottom and inside edge of a horse-shoe, a metallic plate secured on each side to the top of the pad member, staples projecting from the metallic plates and secured to the pad by being embedded therein, and a tension device on the ends of the pad to force the ends apart.

2. A pad for horseshoes, comprising a pad portion arranged to fit the bottom and inside edge of a horse-shoe, a metallic plate secured to the top edge on each side of the pad, staples secured to the plate and embedded in the pad, the pad having a V-shaped recess projecting longitudinally from its back end, and a tension device at the mouth of the recess to force the ends of the pad apart.

3. A pad for horseshoes, comprising a pad portion, a metallic plate arranged on the top of the pad on each side thereof to bear partly on the top edge of a horse-shoe, staples secured to the plates, the staples being embedded in the pad, the pad portion engaging the inside edge and the bottom of the horse-shoe, the tread of the pad being cut away at its forward end, and a tension device between the ends of the metallic plates to force them apart.

In testimony, that I claim the foregoing, I have hereunto set my hand this third day of January, 1907.

JEROME BERNARD McARDLE. [L. S.]

Witnesses:
B. L. WILLIAMS,
WILLIAM A. DOCKERY.